(12) United States Patent
Adachi

(10) Patent No.: US 7,636,127 B2
(45) Date of Patent: Dec. 22, 2009

(54) VIDEO DISPLAY DEVICE INCLUDING VIDEO DEVICE

(75) Inventor: Takafumi Adachi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 751 days.

(21) Appl. No.: 11/270,808

(22) Filed: Nov. 9, 2005

(65) Prior Publication Data

US 2006/0143680 A1    Jun. 29, 2006

(30) Foreign Application Priority Data

Nov. 9, 2004   (JP) .................. P.2004-324921

(51) Int. Cl.
*H04N 5/50* (2006.01)
(52) U.S. Cl. .................. 348/569; 348/563; 386/95
(58) Field of Classification Search ......... 348/522–570; 386/46, 125, 95, 108
See application file for complete search history.

(56) References Cited

U.S. PATENT DOCUMENTS

| | | | |
|---|---|---|---|
| 6,275,267 B1 * | 8/2001 | Kobayashi | 348/555 |
| 7,352,954 B2 * | 4/2008 | Yoo et al. | 386/46 |
| 2004/0223001 A1 * | 11/2004 | Peng | 345/619 |

FOREIGN PATENT DOCUMENTS

| | | |
|---|---|---|
| JP | 11-146288 | 5/1999 |
| JP | 2002-057959 | 2/2002 |
| JP | 2002-152621 | 5/2002 |

OTHER PUBLICATIONS

Patent Abstracts of Japan, Publication No. 11-146288 dated May 28, 1999 (2 pages).
Patent Abstracts of Japan, Publication No. 2002-057959 dated Feb. 22, 2002 (2 pages).
Patent Abstracts of Japan, Publication No. 2002-152621 dated May 24, 2002 (2 pages).

* cited by examiner

*Primary Examiner*—M. Lee
(74) *Attorney, Agent, or Firm*—Osha • Liang LLP

(57) ABSTRACT

A video display device includes: an image display device including: a signal operating unit which operates image quality of a source image; a first OSD unit which generates a first OSD signal; a control unit for controlling the image display device, and a memory which is connected to the control unit; and a video device including: a second OSD unit which generates a second OSD signal; and a video device control unit for controlling the video device, wherein the OSD signal output is always displayed with constant image quality, image quality data of the second OSD display stored in the memory is used as the image quality data of the signal operating unit when the second OSD display is performed, and, if the OSD display is finished, the image quality data of the display returns to the image quality data of the source image.

6 Claims, 3 Drawing Sheets

VIDEO DISPLAY DEVICE INCLUDING VIDEO DEVICE

BACKGROUND OF THE INVENTION

1. Field of the Invention

The present invention relates to an image forming apparatus including a video device such as a medium playback device, and more particularly, to an image forming apparatus including a video device, which can perform on-screen display (OSD) of the image forming apparatus and the video device with the same quality or the substantially same quality.

2. Description of the Related Art

In a TV receiver and a video device such as VTR and DVD playback devices, an on-screen display (OSD) means for displaying various kinds of setting items of the device on a portion of an image display unit and allowing a user to set the items while checking the state of the device is employed. For example, in the OSD display of the DVD, the display of a chapter and a title, the switch of an aspect ratio of a screen, an angle, a stereo sound and a caption, and the state of selecting or controlling the setting items can be controlled while checking the state of the device. In addition, a display unit for the setting items need not be separately provided and the screen or the sound can be controlled while viewing a source image.

Furthermore, even in a case of separately providing the display unit, a user must view the display unit at a distant place as a monitor becomes enlarged. Accordingly, it is difficult to set the items while viewing the display unit provided in the DVD playback device. In addition, similarly, even in the TV receiver or the VTR, it is possible to set the setting items of the TV receiver and the VTR while viewing the image display unit.

Recently, a TV receiver including a video display device and a recording medium playback device, such as a combination of a TV receiver and a VTR playback device and a combination of a TV receiver and a DVD playback device, has increased. This TV receiver need not be connected to various devices and can be installed in a minimum space.

For example, in a TV receiver including a DVD playback device, the state of selecting or controlling the setting items of the TV receiver (image quality such as brightness and contrast, channel setting, time setting, and so on) is OSD-displayed on an image display unit of the TV receiver using an OSD device included in a control unit of the TV receiver. Meanwhile, the state of selecting or controlling the setting items of the DVD playback device (the display of a chapter and a title, the switch of an aspect ratio of a screen, an angle, a stereo sound and a caption, and so on) is OSD-displayed on the image display unit of the TV receiver using a OSD device included in a decode device of the DVD playback device.

Generally, in a case of displaying a source image of satellite broadcasting, ground-based broadcasting, or a DVD on the TV receiver of the video display device, image quality may be frequently changed in accordance with the atmosphere of a place or the image of the respective source. In a case of performing the OSD display using the OSD device included in the TV receiver, a constant image quality is always maintained, regardless of the image quality of the source image. Meanwhile, in a case of performing the OSD display using the OSD device of the DVD playback device, the OSD signal output from the OSD device is transmitted to a signal control unit of the TV receiver as an image signal. Accordingly, the OSD display of the DVD playback device is performed with the image quality of the source image which was displayed just before the OSD display (see JP-A-11-146288, JP-A-2002-57959 and JP-A-2002-152621).

SUMMARY OF THE INVENTION

The image quality of the source image is image quality for comfort viewing, but is not necessarily the image quality suitable for the OSD display. For example, in a case of viewing a movie or sports in a dark room, brightness and contrast may be set to low values. At this time, in a case of performing the OSD display using the OSD device of the TV receiver, the OSD display is performed with a bright image quality, regardless of the image quality of the source image. However, in a case of performing the OSD display using the OSD device of the DVD playback device, since the OSD signal is input to the signal control unit of the TV receiver as the source image, the OSD display is performed with the image quality of the source image and thus the display becomes darker.

Accordingly, an object of the present invention is to constantly maintain the image quality of the OSD display using the respective OSD devices included in a video display device and a video device in the video display device including the video device such as a medium playback device.

In addition, another object of the present invention is to allow the OSD display to be easily viewed using the respective OSD devices included in a video display device and a video device in the video display device including the video device such as a medium playback device.

In order to achieve the above-mentioned objects, the present invention provides a video display device including a video device including: a TV receiver including a tuner which demodulates a radio wave received through an antenna, an external device connecting terminal connected to an external device, a selector which is connected to the tuner, the external device connecting terminal and a DVD playback unit, receives source signals output from the tuner, the external device connecting terminal and the DVD playback unit, and selects and outputs any one of the source signals, a signal operating unit which operates the source signal output from the selector to have predetermined image quality and outputs the operated source signal, an image display unit which displays an image based on the source signal output from the signal operating unit, a first OSD unit which outputs a first OSD signal which is a setting display signal of the TV receiver to the signal operating unit, a control unit for controlling the respective units, a memory which is connected to the control unit and stores data, and an external input unit for transmitting an external operation instruction signal to the control unit; and the DVD playback unit including a motor for rotating a DVD medium, a pickup unit for reading data recorded in the DVD medium, a decoder for decoding the data read by the pickup unit and transmitting the data to the selector as the source signal, a second OSD unit which is provided in parallel to the decoder and outputs a second OSD signal which is a setting display signal of the DVD playback unit to the selector, and a DVD control unit for controlling the respective units, wherein the control unit and the DVD control unit are connected to each other and, when the OSD signal input to the external input unit is input to the control unit, source image display, the first OSD display, and the second OSD display are sequentially repeated, the OSD signal output from the first OSD unit is always displayed with constant image quality, when the display is switched to the second OSD display, the control unit transmits the second OSD signal to the DVD control unit and the second OSD display is performed based on image quality data of the second OSD display stored in the memory, when the second OSD display is finished, the image quality data of the signal operating unit returns to the image quality of the source image before the OSD display is performed, and the image quality data of the second OSD display is the same or the substantially same as that of the first OSD display.

According to this construction, since the image quality data of the second OSD display for controlling the DVD playback unit is the same or the substantially same as that of the first OSD display, the second OSD display is not brighter or darker than the first OSD display. Thus, the setting at the time of the OSD display is easy.

Furthermore, the present invention provides a video display device including a video device including: an image display device including a signal operating unit which operates image quality of a source image based on image quality data, a first OSD unit which generates a first OSD signal for setting the image display device, a control unit for controlling the image display device, and a memory which is connected to the control unit and stores various data; and a video device including a second OSD unit which generates a second OSD signal for setting the video device, and a video device control unit for controlling the video device, wherein the OSD signal output from the first OSD unit is always displayed with constant image quality, the image quality data of the second OSD display previously stored in the memory is used as the image quality data of the signal operating unit when the second OSD display is performed, and, if the OSD display is finished, the image quality data of the display returns to the image quality data of the source image.

According to this construction, since the image quality of the second OSD display for setting the video device is operated using the image quality data which is previously prepared, the second OSD display can be performed with the constant OSD display although the image quality of the source image is changed. Thus, the setting of the video device using the OSD display is easy.

The image quality data of the second OSD display may be the same or the substantially same as that of the first OSD display. In addition, the image quality data of the second OSD display may be optionally set by a user. Furthermore, the image quality data of the second OSD display may be optionally selected from a plurality of image quality data which is previously prepared by a user.

According to the present invention, it is possible to constantly maintain the image quality of the OSD display using the respective OSD devices included in the video display device and the video device in the video display device including the video device such as a medium playback device.

According to the present invention, it is possible to allow the OSD display to be easily viewed using the respective OSD devices included in the video display device and the video device in the video display device including the video device such as a medium playback device.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
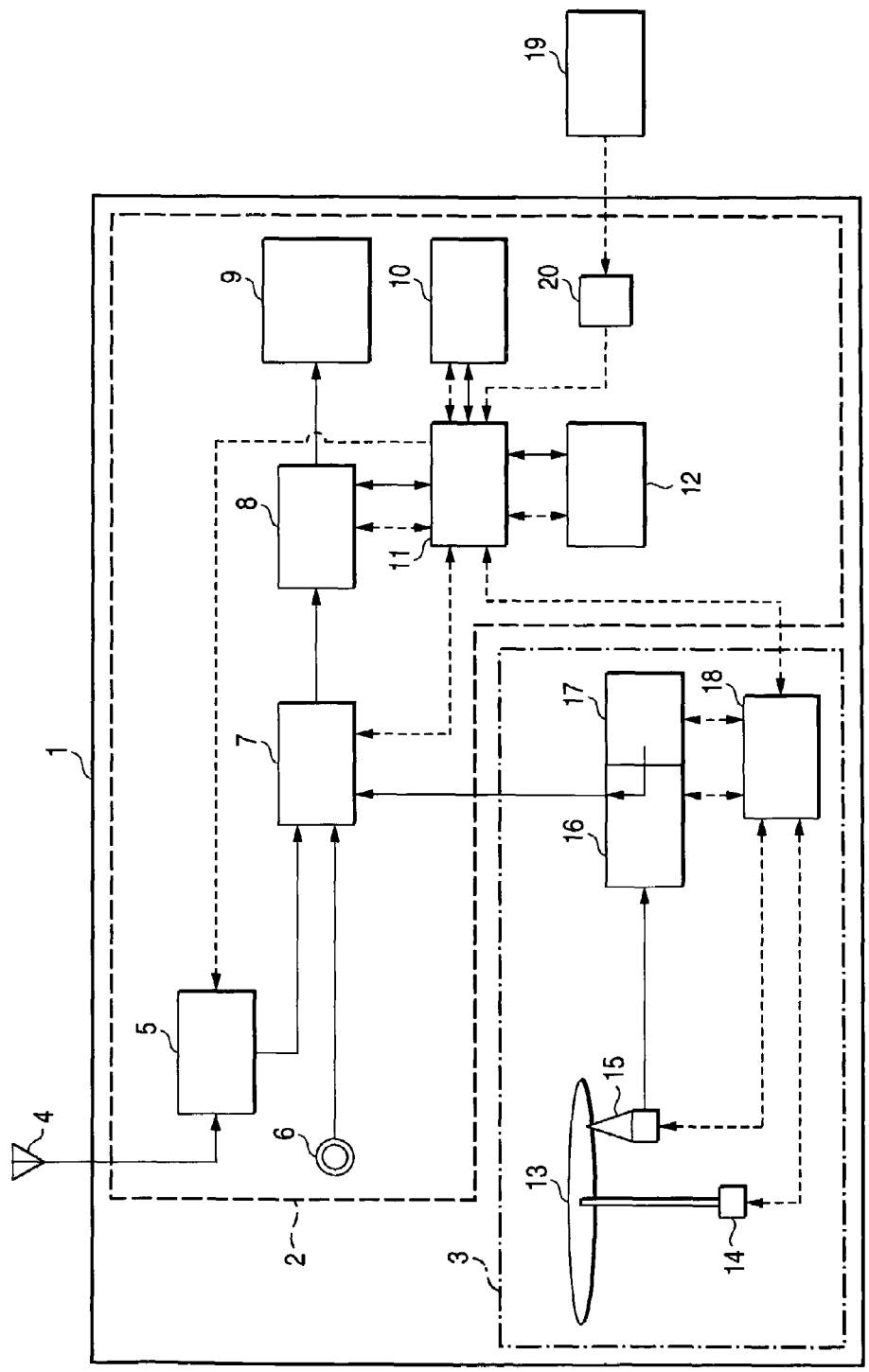
FIG. 1 illustrates a construction of a TV including a DVD playback device, which is an example of a video display device including a video device.

Hereinafter, exemplary embodiments of the present invention will be described with reference to the attached drawings. FIG. 1 illustrates a construction of a TV including a DVD playback device, which is an example of a video display device including a video device according to the present invention. The TV 1 including the DVD playback device illustrated in FIG. 1 includes a TV receiver 2 which is the video display device and a DVD playback unit 3 which is the video device. The TV 1 including the DVD playback device includes a tuner 5 for demodulating a broadcasting signal received through an external antenna 4, a selector 7 for selecting any one of the tuner 5, an external input terminal 6, and a DVD playback unit 3 as a signal transmitting source and receiving a source signal from the selected signal transmitting source, a signal operating unit 8 for controlling the image quality of the signal output from the selector 7 and sending the controlled signal to an image display unit 9, a first OSD unit 10 for generating a first OSD signal for setting the TV receiver, a control unit 11, and a memory 12 connected to the control unit 11.

The DVD playback unit 3 includes a driving motor 14 for rotating a medium 13, a pickup unit 15 for reading data recorded in the medium 13, a decoder 16 for receiving the data read by the pickup unit 15 and decoding the data, a second OSD unit 17 which is provided in parallel with the decoder 16 and generates a second OSD signal for setting the DVD playback unit 3, and a DVD control unit 18 for controlling the DVD playback unit 3.

The control unit 11 includes an external input unit 20 for receiving an external input. The external input unit 20 is a receiving unit of a remote controller 19, but is not limited to this. In FIG. 1, a solid arrow represents data such as a source image signal and an OSD signal, a dotted arrow represents a control signal.

The TV 1 including the DVD playback device receives an instruction from the remote controller 19 and the selector 7 determines the signal transmitting source which transmits the signal to be received. For example, in a case where TV broadcasting is selected by the remote controller 19, the selector 7 receives a signal which is received by the antenna 4 and demodulated by the tuner 5, converts it into an image signal, and sends the converted signal to the signal operating unit 8. The signal operating unit 8 operates the signal to have predetermined image quality and sends the signal to the image display unit 9, thereby displaying the image on the image display unit 9. At this time, if an instruction for switching the channel is input by the remote controller 19, the control unit 11 transmits the instruction to the tuner 5 and allows the tuner 5 to switch the channel.

Furthermore, when the DVD playback is selected by the remote controller 19, the selector 7 is switched to receive the signal from the decoder 16 and the control unit 11 transmits the signal of information on the DVD playback to the DVD control unit 18. The DVD control unit 18, which receives the signal, controls the motor 14 and the pickup unit 15 and reads data from the DVD medium 13 by the pickup unit 15. The read data is sent to the decoder 16 and decoded in the decoder 16. The decoded signal is input to the selector 7. The operations of the units located next to the selector 7 are the same as those of the case of using the tuner 5.

Figure 2:
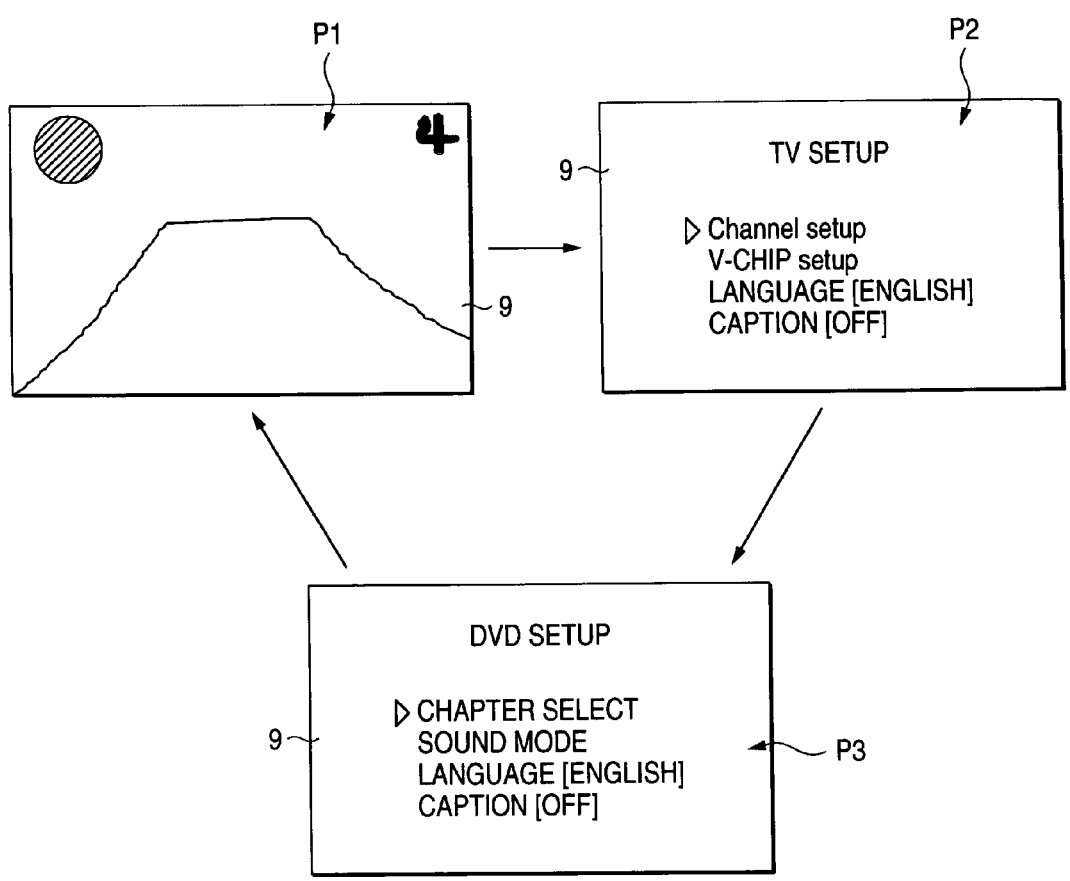
FIG. 2 illustrates the order of OSD display of the TV including the DVD playback device illustrated in FIG. 1.

FIG. 2 illustrates the order of OSD display of the TV including the DVD playback device illustrated in FIG. 1. As illustrated in FIG. 2, the TV 1 including the DVD playback device performs first OSD display P2 for setting the image quality of the TV receiver 2 when an OSD instruction is input by the remote controller 19 in the state that the source image display P1 (here, the playback display of the DVD medium 13) is performed. When an instruction is input by the remote controller 19 in the state of performing the first OSD display P2, second OSD display P3 for setting the image quality of the DVD playback unit 3 is performed. Thereafter, when an instruction is input by the remote controller 19 in the state of performing the second OSD display P3, the source image display P1 is performed again.

Figure 3:
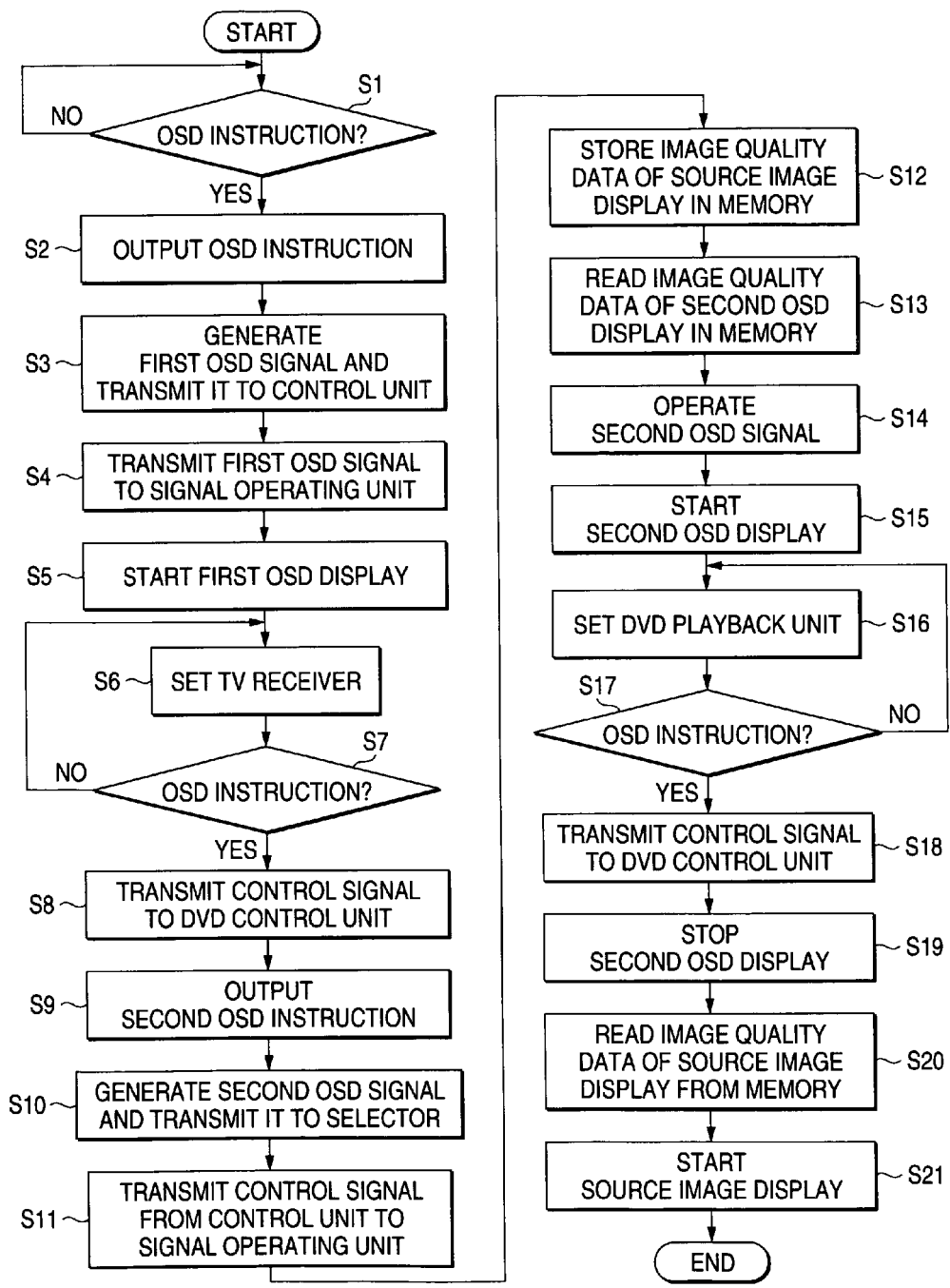
FIG. 3 is a flowchart illustrating an operation of the TV including the DVD playback device illustrated in FIG. 1.

A flowchart illustrating the operation of the TV including the DVD playback device is illustrated in FIG. 3. In the state of playing the DVD medium 13 by the image display unit 9, it is determined whether the OSD instruction is input by the remote controller 19 (step S1). If the OSD instruction is not input (in the step S1, No), the process returns to the step S1 and thus the determination is repeatedly performed. If the OSD instruction is input (in the step S1, YES), the control unit 11 sends a signal to the first OSD unit 10 (step S2). The first OSD unit 10, which receives the signal, generates an OSD signal and sends it to the control unit (step S3).

The control unit 11 sends the received OSD signal to the signal operating unit 8 (step S4). At this time, the signal operating unit 8 sends the OSD signal to the image display unit 9 (step S5). The first OSD display is performed with the constant image quality, regardless of the image quality data at the time of displaying the source image. The setting of the TV receiver 2 is changed while viewing the first OSD display on the image display unit 9 (step S6).

At this time, it is determined whether the OSD instruction is input by the remote controller 19 (step S7). If the OSD instruction is not input (in the step S7, NO), the process returns to the step S6 and the setting is performed. If the OSD instruction is input (in the step S7, YES), the control unit 11 sends a signal representing that the OSD instruction is input to the DVD control unit 18 (step S8). When the DVD control unit 18 receives the OSD signal, it sends the signal to the second OSD unit 17 (step S9). The second OSD unit 17 generates an OSD signal and sends it to the selector 7 through the decoder 16 (step S10).

At this time, the control unit 11 transmits a signal representing that the second OSD display is performed to the signal operating unit 8 using the second OSD unit 17 (step 11). When the signal operating unit 8 receives the signal transmitted in the step S11, the signal operating unit 8 sends the current image quality stored therein to the control unit 11 as image quality data of the source image display and stores it in the memory 12 (step S12) At this time, the control unit 11 reads image quality data of the OSD display which is set to perform the display with the same image quality as that of the first OSD display stored in the memory 12, and sends it to the signal operating unit 8 (step S13).

When the OSD signal is input from the selector 7 to the signal operating unit 8, the OSD signal is operated based on the image quality data sent to the signal operating unit 8 in the step S13 (step S14) and the operated signal is then sent to the image display unit 9 to perform the second OSD display (step S15). This image quality data is equal to the image quality data of the first OSD display and the second OSD display is performed with the constant image quality regardless of the image quality data at the time of displaying the source image.

The setting of the DVD playback unit 3 is changed while viewing the second OSD display P3 on the image display unit 9 (step S16).

It is determined whether the OSD instruction is input by the remote controller 19 (step S17). If the OSD instruction is not input (in the step S17, NO), the process returns to the step S16 and the setting of the DVD playback unit 3 is changed. If the OSD instruction is input (in the step S17, YES), the control unit 11 sends a signal to the DVD control unit 18 and notifies the DVD control unit 18 that the OSD signal is received (step S18). The DVD control unit 18 stops the second OSD display (step S19).

The signal operating unit 8 reads the image quality data of the source image stored in the memory 12 (step S20), operates the image quality of the source image based on the image quality data, and sends it to the image display unit 9 to display the source image (step S19).

As described above, the first OSD display using the first OSD unit 10 of the TV receiver 2 and the second OSD display using the second OSD unit 17 of the DVD playback unit can be performed with the same image quality and thus uncomfortable feeling due to the image quality difference between the first OSD display and the second OSD display can be reduced.

When the second OSD display is performed by the second OSD unit 17 of the DVD playback unit 3, the image quality of the second OSD display may be controlled. When the second OSD display is performed, the image quality of the second OSD display is changed. Furthermore, the changed image data is stored in the memory as the image quality data of the OSD display. At this time, the changed image quality data of the OSD display is overwritten on previous data. Thereafter, until the image quality is changed, the second OSD display is performed using the changed image quality data of the OSD display.

At this time, a plurality kinds of image data may be previously prepared in the memory 12 and selected by a user. Moreover, the selected image data may be changed according to the user's preference and stored in the memory 12 as the image quality data of the OSD display. In a case where the image quality is not changed, the image quality data of the OSD display is the image quality data which is previously determined such that the second OSD display has the same image quality as the first OSD display. Moreover, although the image quality is changed by the user, the image quality data of the OSD display is replaced with the image quality data having the same image quality as that of the first OSD display in accordance with the demand of the user.

Although the DVD playback device is illustrated as the video device in the aforementioned embodiment, the present invention is not limited to this. The video device such a VTR and a hard disk recorder may be widely employed. Although the source image display, the first OSD display, and the second OSD display are sequentially switched in the aforementioned embodiment, the present invention is not limited to this. Furthermore, the display may be performed at any timing, without being sequentially switched.

What is claimed is:

1. A video display device including a video device comprising:
   a TV receiver including:
      a tuner which demodulates a radio wave received through an antenna; an external device connecting terminal connected to an external device;
      a selector which is connected to the tuner, the external device connecting terminal and a DVD playback unit, receives source signals output from the tuner, the external device connecting terminal and the DVD playback unit, and selects and outputs any one of the source signals;

a signal operating unit which operates the source signal output from the selector to have predetermined image quality and outputs the operated source signal;

an image display unit which displays an image based on the source signal output from the signal operating unit;

a first OSD unit which outputs a first OSD signal which is a setting display signal of the TV receiver to the signal operating unit;

a control unit for controlling the respective units; a memory which is connected to the control unit and stores data, and an external input unit for transmitting an external operation instruction signal to the control unit;

the DVD playback unit including:

a motor for rotating a DVD medium;

a pickup unit for reading data recorded in the DVD medium; a decoder for decoding the data read by the pickup unit and transmitting the data to the selector as the source signal; a second OSD unit which is provided in parallel to the decoder and outputs a second OSD signal which is a setting display signal of the DVD playback unit to the selector; and a DVD control unit for controlling the respective units, wherein: the control unit and the DVD control unit are connected to each other and, when the OSD signal input to the external input unit is input to the control unit, source image display, the first OSD display, and the second OSD display are sequentially repeated;

the OSD signal output from the first OSD unit is always displayed with constant image quality; when the display is switched to the second OSD display, the control unit transmits the second OSD signal to the DVD control unit and the second OSD display is performed based on image quality data of the second OSD display stored in the memory;

when the second OSD display is finished, the image quality data of the signal operating unit returns to the image quality of the source image before the OSD display is performed; and the image quality data of the second OSD display is the same or the substantially same as that of the first OSD display.

2. An apparatus, comprising:

a first source signal generator, operable to generate, as a first internal source signal, a first image signal corresponding to a first video image;

a first OSD signal generator, operable to generate a first OSD signal corresponding to a first OSD image;

a second source signal generator, operable to generate, as a second internal source signal, either a second image signal corresponding to a second video image or a second OSD signal corresponding to a second OSD image;

a selector, operable to select either the first internal source signal or the second internal source signal as an output signal;

an image display device;

a memory, storing first image quality data corresponding to first image quality which is image quality of the second OSD image, and operable to store second image quality data corresponding to second image quality which is image quality of the second video image;

a signal operator, operable to modify the output signal based on either the first image quality data or the second image quality data, thereby generating a modified output signal, and operable to input one of the output signal, the modified output signal and the first OSD signal to the image display device, thereby causing the image display device to display one of the first video image, the first OSD image, the second video image and the second OSD image;

a first controller, operable to cause the signal operator to input the first OSD signal with a third image quality which is irrespective of image quality of the first video image; and a second controller, operable to cause the second source signal generator to generate either the second image signal or the second OSD signal, where:

the first controller is operable to cause the memory to store the second image quality data, and cause the signal operator to modify the output signal based on the first image quality data, when the second controller causes the second source signal generator to generate the second OSD signal; and the first controller is operable to cause the signal operator to modify the output signal based on the second image quality data, when the second controller causes the second source signal to generate the second OSD signal.

3. The apparatus according to claim 2, wherein the first image quality is substantially identical with the third image quality.

4. The apparatus according to claim 2, wherein the first image quality is adjustable.

5. The apparatus according to claim 4, wherein a plurality of image qualities are selectably stored in the memory as the first image quality data.

6. The apparatus according to claim 2, wherein the first source signal generator is a tuner and the second source signal generator is an image reproduction device.

* * * * *